United States Patent
Lohmann

(10) Patent No.: US 8,146,563 B2
(45) Date of Patent: Apr. 3, 2012

(54) INTERNAL COMBUSTION ENGINE WITH HIGH SQUISH PISTON

(75) Inventor: Craig W. Lohmann, Denver, IA (US)

(73) Assignee: Deere & Company, Moline, IL (US)

( * ) Notice: Subject to any disclaimer, the term of this patent is extended or adjusted under 35 U.S.C. 154(b) by 681 days.

(21) Appl. No.: 12/237,087

(22) Filed: Sep. 24, 2008

(65) Prior Publication Data

US 2010/0071653 A1    Mar. 25, 2010

(51) Int. Cl.
*F02F 3/26* (2006.01)
(52) U.S. Cl. .................... 123/276; 123/298; 123/664
(58) Field of Classification Search ............... 123/41.35, 123/193.6, 262, 263, 276, 298, 590, 663, 123/664, 279, 299, 301, 269
See application file for complete search history.

(56) References Cited

U.S. PATENT DOCUMENTS

| | | | |
|---|---|---|---|
| 1,633,541 A * | 6/1927 | Braren ........................ | 123/276 |
| 4,953,528 A * | 9/1990 | Oikawa et al. ............... | 123/276 |
| 5,029,563 A * | 7/1991 | Hu ............................... | 123/262 |
| 5,081,968 A * | 1/1992 | Bruni .......................... | 123/193.6 |
| 5,285,755 A | 2/1994 | Regueiro | |
| 5,685,281 A | 11/1997 | Li | |
| 5,868,112 A * | 2/1999 | Mahakul et al. ............. | 123/263 |
| 6,601,561 B1* | 8/2003 | Liu et al. ...................... | 123/276 |
| 6,732,703 B2* | 5/2004 | Eckerle et al. ............... | 123/298 |
| 6,910,455 B2 | 6/2005 | Sczepanski et al. | |
| 6,955,165 B2* | 10/2005 | Liu .............................. | 123/663 |
| 6,966,294 B2 | 11/2005 | Eckerle et al. | |
| 7,185,614 B2 | 3/2007 | Meffert et al. | |
| 7,210,448 B2 | 5/2007 | Stanton et al. | |
| 7,380,536 B2 | 6/2008 | Issler | |
| 7,438,039 B2* | 10/2008 | Poola et al. ................. | 123/193.6 |
| 2007/0107215 A1* | 5/2007 | Scharp ....................... | 29/888.042 |

* cited by examiner

*Primary Examiner* — Noah Kamen
(74) *Attorney, Agent, or Firm* — Taylor IP, P.C.

(57) ABSTRACT

A piston crown for a diesel engine in which the crown has an annular recess coaxial with an injector injecting fuel in a radiated, non-swirl pattern. The recess has an internal central crown portion approximately parallel to the angle of the fuel injected and a curved outer section to curve air compressed by the piston significantly enough that it is directed back toward the central axis and mixes with the fuel injected along the internal central crown portion to promote mixing and reduction in soot formation.

5 Claims, 2 Drawing Sheets

INTERNAL COMBUSTION ENGINE WITH HIGH SQUISH PISTON

BACKGROUND OF THE INVENTION

Field of the Invention

The present invention relates to internal combustion engines and, and, more specifically, to pistons for such engines.

The configuration of pistons in internal combustion engine has been the subject of design and development for decades. Particularly in the field of compression ignition, or diesel engines, the configuration of the portion of the piston exposed to the combustion process has been highly developed. The reason for this is that the compression ignition engine relies on the heat of compression to ignite fuel that has been injected in measured and timed quantities to provide the appropriate combustion which results in maximum efficiency and power. With the advent of regulations placed on emissions from internal combustion engines by the EPA, the design of the combustion chamber has received increased attention.

It is common to provide a diesel engine combustion chamber within a cylinder having reciprocating pistons. The pistons are displaced from a maximum volume to a minimum volume during which the air that has entered the combustion chamber is compressed and its temperature increased. In the vicinity of the minimum volume or top dead center (TDC), fuel is injected into the compressed air and the resultant mixture ignited to provide the expansion stroke for the piston. There are two major systems for orienting the fuel injection relative to the piston. The first is a high swirl system in which the fuel is injected and the air flows in a circular motion around the crown of the piston. The other is a quiescent or zero swirl arrangement in which the fuel is injected from a central location in a uniform radial pattern and distribution. To enhance the mixture of the compressed air and fuel, a so called Mexican hat has been proposed for the piston crown. This involves a central peak with a curved annular outer section to promote mixture within the molecules of air and the fuel.

However, for ever decreasing emissions limitations, particularly in the area of soot formation, the traditional crown configurations impose a limit on the reduction of soot and oxidization.

What is needed in the art, therefore, is a piston having a configuration for minimizing soot and increasing combustion efficiency.

SUMMARY OF THE INVENTION

In one form, the invention is a piston for an internal combustion (IC) reciprocating engine. The piston includes a cylindrical form having a connection to provide reciprocating motion in response to a combustion event involving air and an injected fuel quantity from an injector providing fuel injection from a central location in a radiated, substantially non-swirl pattern. A crown is formed on the end of the cylindrical form, the crown having an annular recess with a center of rotation substantially coaxial with the central location for the injector. A central peak is in the recess and forms an angle with respect to the central axis that is approximately parallel with the injected fuel. A substantially curved outer section directs air compressed by the piston around the curve and toward the central axis to mix with and be directed along the peak by the injected fuel.

In another form, the invention is an internal combustion engine including a cylinder block having at least one cylinder for receiving a piston. A cylindrical piston is reciprocable within the cylinder in response to a combustion event involving air and an injected fuel quantity from an injector providing fuel injection from a central location in a radiated, substantially non-swirl pattern. A fuel injector injects fuel into the combustion chamber in a measured and timed quantity. The piston has a crown formed on the end thereof facing the combustion chamber, the crown having an annular recess with a central axis substantially coaxial with the central location for the injector and a internal central crown portion forming an angle with respect to the central axis that is approximately parallel with the injected fuel and a substantially curved outer portion directing air compressed by the piston around the curve and toward said central axis to mix with and be directed along the peak by the fuel.

BRIEF DESCRIPTION OF THE DRAWINGS

The above-mentioned and other features and advantages of this invention, and the manner of attaining them, will become more apparent and the invention will be better understood by reference to the following description of an embodiments of the invention taken in conjunction with the accompanying drawings, wherein.

Corresponding reference characters indicate corresponding parts throughout the several views. The exemplifications set out herein illustrates one embodiment of the invention, in one form, and such exemplifications are not to be construed as limiting the scope of the invention in any manner.

DETAILED DESCRIPTION OF THE INVENTION

Figure 1:
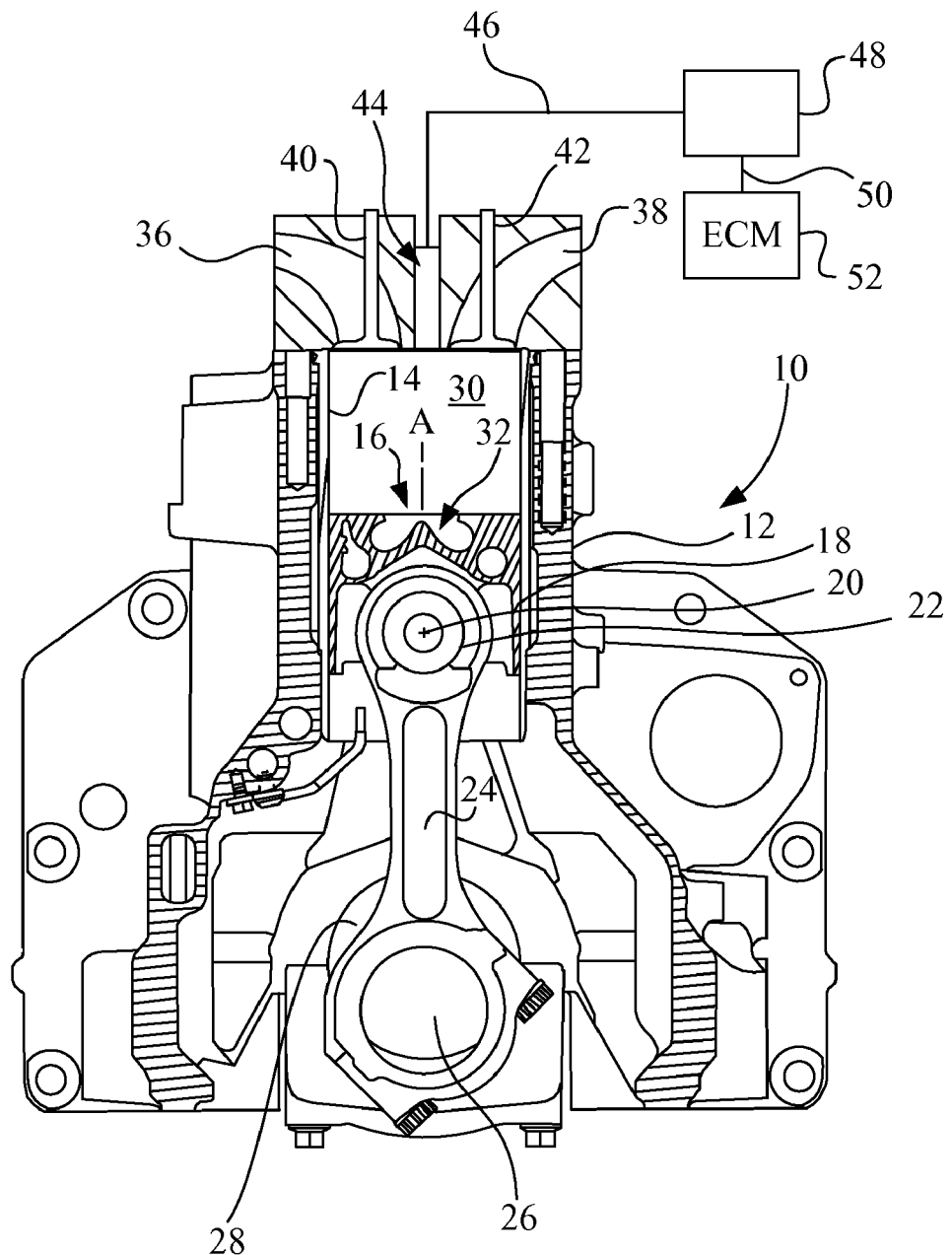
FIG. 1 is a cross sectional view of an engine having a piston embodying the present invention; and, FIG. 2 is an expanded detailed view of the piston incorporated in FIG. 1.

FIG. 1 shows an engine 10 of the reciprocating internal combustion engine type. Engine 10 operates on the principal of reciprocating pistons moved in response to a combustion event in a combustion chamber. As illustrated herein, the reciprocating motion of the pistons is converted into rotary motion through the means of a crankshaft. However, it should be apparent to those skilled in the art that the reciprocating motion of the pistons may be utilized in the form of a linear electrical generator in which movement of pistons and ferromagnetic materials induces an electrical power output.

Engine 10 includes a block 12 having a plurality of bores 14 for receiving reciprocating pistons 16, only one of which is shown. The cylinder bores 14 may be cast integral with the block 12 or, as illustrated herein, may be separate liners so as to enhance the rebuilding process.

The piston 16 includes a cylindrical form 18 having a pivotal connection 20 for receiving a wrist pin 22 connected to a connecting rod 24. Connecting rod 24 is rotatably connected to a crank throw or crankpin 26 on a crankshaft 28 suitably journaled within block 12 to provide a rotary power output in response to reciprocation of piston 16. It should be noted that a plurality of pistons may be provided depending upon the requirements and duty cycle of the engine 10.

Piston 16 reciprocates within cylinder 14 to define a combustion chamber 30 bounded by the cylinder 14, a crown 32 of piston 16, and a head 34. Head 34 has intake passages 36 and exhaust passages 38. Combustion air passes through intake passage 36 past intake valve 40 for entry into combustion chamber 30. Products of combustion exit combustion chamber 30 past exhaust valve 42 to exhaust port 38.

The intake air, as is apparent to those skilled in the art, may be pressurized by a compressor of a turbocharger and cooled by means of an after cooler. The exhaust gasses passing from exhaust port 38 typically pass through a turbocharger turbine and then to exhaust after treatment devices. It is also common to provide exhaust gas recirculation which provides a portion of the exhaust gas to the intake port 36, either cooled or uncooled, to reduce the combustion temperatures and reduce the oxides of nitrogen.

Engine 10, as illustrated, operates on a compression ignition cycle in which air that has entered combustion chamber 30 past intake port 36 and valve 40 is pressurized to such an extent that fuel injected from an injector nozzle 44 via line 46 from fuel injection system 48 at the appropriate time and in the appropriate quantity is ignited by the heat of compression. Injection from nozzle 44 may be from a variety of systems including high pressure common rail, distributor pump, and direct injection in which pressure is generated at the nozzle. Control of fuel injection system 48 is from an ECM 52 via interconnection 50.

In any of the systems, the fuel is injected from an axis A coaxial with the axis of the injector 44 in a radiated pattern so as to permeate the combustion chamber 30. As is well known to those skilled in the art, the number of discrete holes provided in injector 40, their cross sectional flow area and the angle they make with respect to the central axis A of injector 44 is selected according to the design requirements of engine 10. Although the preferred location of injector 44 is coaxial with the axis of combustion chamber 30, it should be apparent to those skilled in the art that the injector 44 may be offset from the central axis.

In accordance with the present invention, piston 16 has a crown 32 that improves the combustion process. The configuration of crown 32 is shown in expanded detail in FIG. 2. Piston crown 32 has an upper surface 54 connecting with the piston body 18. It should be noted that piston body 18 has circumferential grooves 56, 58, and 60 for appropriate compression and oil scraper rings (not shown).

Upper surface 54 has an annular recess 62 defined by an outer diameter 64. The annular recess 62 is coaxial with the axis of injector 44 whether the injector 44 is on the center line of the combustion chamber 30 or elsewhere. The recess 62 has a central crown portion 66 with a peak 68 coaxial with axis A. The central crown portion 66 blends into an annular curved portion 70 having a substantial curve to outer diameter 64 such that air compressed within recess 62 curves around portion 70 and is directed towards central axis A.

Figure 2:
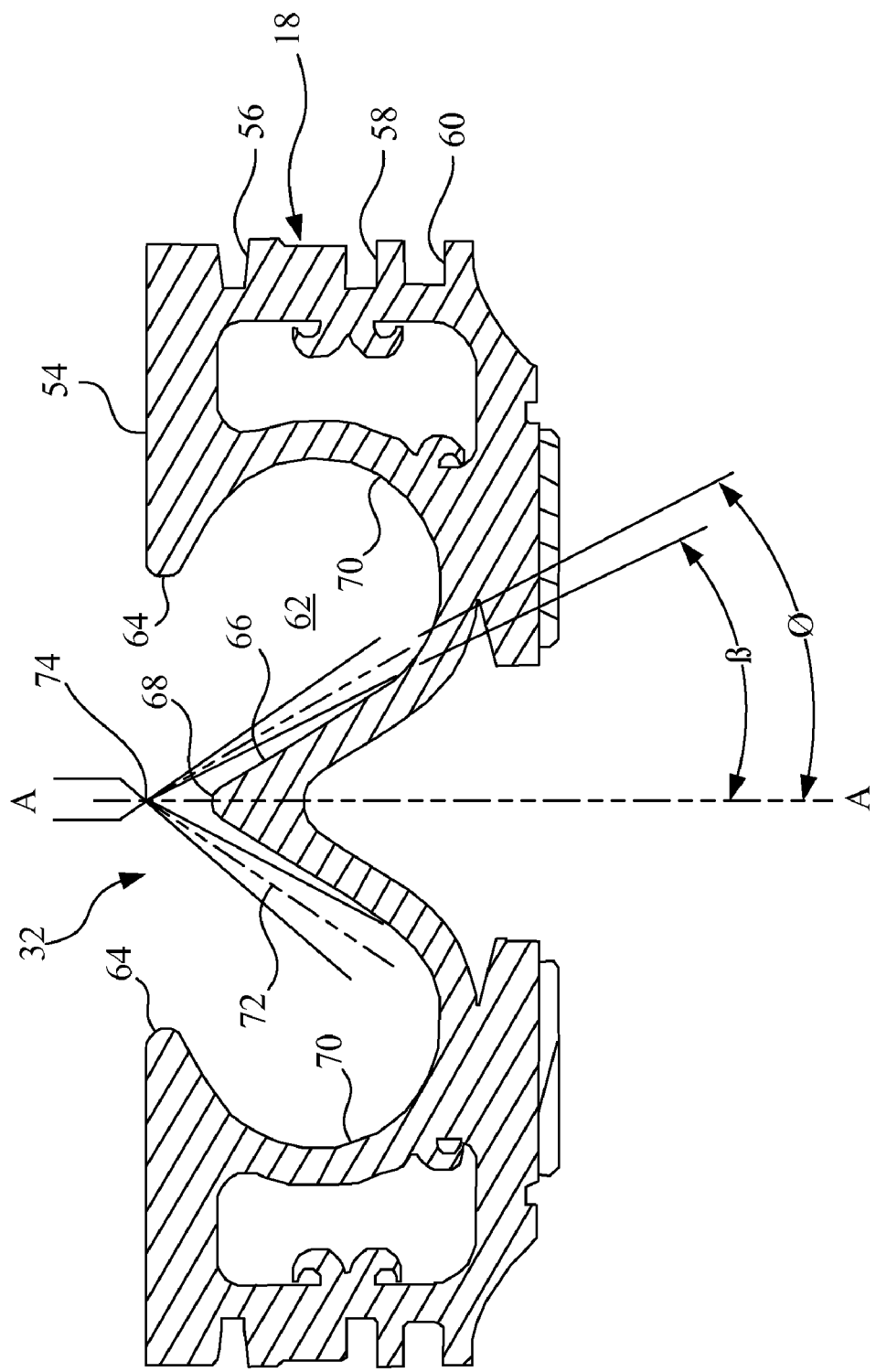

The configuration of central crown portion 66 is such that it is approximately parallel to the angle of injection 72 from a point 74 on injector 44. The range of angles .PHI.-.beta. as shown in FIG. 2 with respect to the axis A is between 0.degree. and 5.degree. The included angle the surface of the crown portion makes with the axis A is between approximately 50.degree. and 80.degree. The outer diameter 64 of the opening to recess 62 is no greater than 40% of the piston diameter thus giving an aggressive swish motion within recess 62. The configuration of the outer curved portion 70 relative to the central crown portion is such that it turns the fluid through greater than 180.degree.

In operation, the piston 16 moves from bottom dead center towards the head 34 to decrease the volume of the combustion chamber 30 and thus pressurize and increase the temperature of the air within combustion chamber 30. As the piston moves towards top dead center, the central crown portion 66 from the peak 66 causes the air to be moved down the peak and around the curved section 70 onto itself. When the injection event is initiated, the high pressure of injection adds to the motion of the air to enhance and increase the mixture. The net result of this is substantially lower soot formation. Furthermore, the increased turbulence of the fuel/air mixture leaving the relatively small bowl enhances the oxidization of soot to prevent a generation of particulates. It should be noted in FIG. 2 that the outer diameter 64 and peak 68 are curved so as to prevent the occurrence of sharp corners and, thus, localized hot spots and stress generators. It should be noted that the fuel injected from injector 44 cannot have swirl relative to the central axis A in order to promote the efficient entrainment of fuel particles within the air. It is also to be noted that the recess 62 may be offset from the central axis of piston 16 so long as the central axis of the recess 62 is coaxial with the axis of a fuel injector.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An internal combustion engine comprising:
   a cylinder block having at least one cylinder for receiving a piston;
   a cylindrical piston reciprocable within said cylinder in response to a combustion event involving air and an injected fuel quantity from an injector providing fuel injection from a central location in a radiated, substantially non-swirl pattern;
   a fuel injector injecting fuel into said combustion chamber in a measured and timed quantity;
   said piston having a crown formed on the end thereof facing said combustion chamber, the crown having an annular recess with a central axis substantially coaxial with the central location for said injector and a internal central crown portion forming an angle with respect to the central axis that between 0 percent and 5 percent of the angle with which fuel is injected into said combustion chamber and a substantially curved outer portion directing air compressed by said piston around the curve and toward said central axis to mix with and be directed along said peak by said fuel and wherein the outer diameter of the opening to said annular recess is no greater than 40% of the diameter of said piston.

2. The internal combustion engine of claim 1 wherein said central location is coaxial with the piston axis.

3. The piston as claimed in claim 1 wherein the curved portion of said recess is configured relative to the internal central crown portion such that it turns fluid through greater than 180°.

4. The internal combustion engine as claimed in claim 1 wherein the included angle of said internal central crown portion is between 50° and 80°.

5. The internal combustion engine as claimed in claim 1 wherein the intersections of said recess with said crowns are rounded.

* * * * *